(12) United States Patent
Green et al.

(10) Patent No.: US 8,780,091 B2
(45) Date of Patent: Jul. 15, 2014

(54) METHODS AND SYSTEMS FOR CONTROLLING AN INFORMATION DISPLAY

(75) Inventors: Sharon Ann Green, Clearwater, FL (US); Andrew Thomas Schrauben, Lowell, MI (US)

(73) Assignee: General Electric Company, Schenectady, NY (US)

( * ) Notice: Subject to any disclaimer, the term of this patent is extended or adjusted under 35 U.S.C. 154(b) by 339 days.

(21) Appl. No.: 13/358,122

(22) Filed: Jan. 25, 2012

(65) Prior Publication Data

US 2012/0206358 A1   Aug. 16, 2012

Related U.S. Application Data

(60) Provisional application No. 61/441,477, filed on Feb. 10, 2011.

(51) Int. Cl.
*G06F 3/033* (2013.01)
*G06F 3/0484* (2013.01)

(52) U.S. Cl.
CPC ............ *G06F 3/033* (2013.01); *G06F 3/04847* (2013.01)
USPC ............................ 345/184; 345/156; 715/786

(58) Field of Classification Search
CPC ... G06T 2200/24; G01C 23/00; G06F 3/0414; G06F 3/04847; G09G 5/003
USPC .......... 345/156, 157, 163, 474, 184; 715/833, 715/786; 381/314
See application file for complete search history.

(56) References Cited

U.S. PATENT DOCUMENTS

| | | | |
|---|---|---|---|
| 5,136,301 A | | 8/1992 | Bechtold et al. |
| 5,751,285 A | * | 5/1998 | Kashiwagi et al. ........... 715/833 |
| 6,373,463 B1 | | 4/2002 | Beeks |
| 6,571,155 B2 | | 5/2003 | Carriker et al. |
| 7,222,308 B2 | * | 5/2007 | Sauermann et al. .......... 715/833 |
| 8,253,747 B2 | * | 8/2012 | Niles et al. .................... 345/474 |
| 2002/0030701 A1 | * | 3/2002 | Knight .......................... 345/810 |
| 2003/0058134 A1 | | 3/2003 | Sherry et al. |
| 2006/0187201 A1 | * | 8/2006 | Rosenberg et al. ........... 345/156 |
| 2006/0236248 A1 | * | 10/2006 | Eischeid et al. ............... 715/751 |
| 2008/0094367 A1 | * | 4/2008 | Van De Ven et al. ......... 345/173 |
| 2009/0293019 A1 | * | 11/2009 | Raffel et al. .................. 715/833 |
| 2009/0306794 A1 | * | 12/2009 | Eischeid et al. ................ 700/75 |
| 2010/0023187 A1 | | 1/2010 | Gannon et al. |
| 2010/0036548 A1 | | 2/2010 | Nichols et al. |
| 2010/0114406 A1 | | 5/2010 | DeJonge et al. |

(Continued)

OTHER PUBLICATIONS

Search Report and Written Opinion from corresponding EP Application No. 12154745.9, Dated Jun. 28, 2012.

*Primary Examiner* — Thuy Pardo
(74) *Attorney, Agent, or Firm* — William Scott Andes, Esq.; Armstrong Teasdale LLP

(57) ABSTRACT

A vehicle instrument system is described. The vehicle instrument system includes an input device configured to receive an input command, a display screen configured to display information, and a processing device coupled to the input device and the display screen. The processing device is configured to determine at least one parameter limit, receive at least one input signal from the input device that corresponds to a manual adjustment of the at least one parameter limit from a first limit value to a second limit value, and provide the second limit value to the display screen for display on the display screen.

19 Claims, 6 Drawing Sheets

(56) References Cited

U.S. PATENT DOCUMENTS

| | | |
|---|---|---|
| 2011/0010082 A1 | 1/2011 | Wilson et al. |
| 2012/0269369 A1* | 10/2012 | Yanz et al. ............. 381/314 |
| 2013/0113807 A1* | 5/2013 | Niles et al. ............. 345/473 |

* cited by examiner ness by flight crew of complex and dynamic relevant elements of the current flight environment. Such elements may include other aircraft, weather conditions, and a physical status of the known aircraft. Such situational awareness may also include an ability to forecast and then respond appropriately moment-to-moment and event-to-event to execute tasks based on those perceptions.
METHODS AND SYSTEMS FOR CONTROLLING AN INFORMATION DISPLAY

CROSS-REFERENCE TO RELATED APPLICATION

This application claims the benefit of Provisional Patent Application Ser. No. 61/441,477, filed Feb. 10, 2011, which is hereby incorporated by reference in its entirety.

BACKGROUND OF THE INVENTION

The embodiments described herein relate generally to vehicle instrumentation, and more specifically, to methods and systems for displaying and adjusting parameter limits on a display screen included within the vehicle instrumentation.

At least some known aircraft include an electronic flight instrument system (EFIS). In an EFIS, conventional electro-mechanical flight instruments are replaced by at least one electronic display, for example, a liquid crystal display (LCD), a light emitting diode (LED) display, or a cathode ray tube (CRT) display. The EFIS may include a primary flight display (PFD) that provides continuous flight status input to a flight crew, e.g., the pilot, co-pilot, and/or navigator of an aircraft. Typically, the EFIS presents flight information on the PFD in a format similar to that shown by electro-mechanical flight instruments, however, the electronic display provides flexibility to provide additional information and/or for altering the presentation of the flight information. Such information typically includes aircraft attitude, altitude, vertical speed, horizontal airspeed, and horizontal situation, e.g., aircraft heading. Also, such information contributes to improved situational awareness. Situational awareness is defined as continuous and conscious perception by flight crew of complex and dynamic relevant elements of the current flight environment. Such elements may include other aircraft, weather conditions, and a physical status of the known aircraft. Such situational awareness may also include an ability to forecast and then respond appropriately moment-to-moment and event-to-event to execute tasks based on those perceptions.

Certain flight parameters must be maintained within specific ranges during different phases of a flight. For example, airspeed must be maintained within a specific range in order to maintain an altitude or to provide a steady descent to prepare for landing. Typically, the pilot manually determines such ranges using charts or tables. Alternatively, the EFIS may determine such ranges, which may be changed by the pilot to account for flight conditions the EFIS does not monitor. However, such changes are not limited to ensure range limits are not exceeded.

BRIEF DESCRIPTION OF THE INVENTION

In one aspect, a vehicle instrument system is provided. The vehicle instrument system includes an input device configured to receive an input command and a display screen configured to display information including a first parameter value associated with a first parameter on a sliding scale. The vehicle instrument system also includes a processing device coupled to the input device and the display screen and configured to determine at least one parameter limit for the first parameter and provide the parameter limit to the display screen for display on the sliding scale. The processing device is also configured to receive an adjustment signal from the input device that corresponds to a manual adjustment of the parameter value from the first parameter value to a second parameter value, and provide the second parameter value to the display screen for display on the sliding scale.

In another aspect, a method for modifying a parameter value determined by a vehicle instrument system is provided. The vehicle instrument system includes an input device, a display screen, and a processing device. The method includes determining a first parameter value of a first parameter and providing the first parameter value to the display screen for display on a sliding scale. The method also includes determining at least one parameter limit for the first parameter and providing the parameter limit to the display screen for display on the sliding scale. The method also includes receiving an adjustment signal from the input device that corresponds to a manual adjustment of the first parameter value from the first parameter value to a second parameter value. The method also includes providing the second parameter value to the display screen for display on the sliding scale.

DETAILED DESCRIPTION OF THE INVENTION

The following detailed description illustrates the disclosure by way of example and not by way of limitation. The description should enable one skilled in the art to make and use the disclosure, describes several embodiments, adaptations, variations, alternatives, and uses of the disclosure, including what is presently believed to be the best mode of carrying out the disclosure. The disclosure is described as applied to exemplary embodiments, namely, systems and methods for displaying and adjusting parameter values pertaining to aircraft operation. However, it is contemplated that this disclosure has general application to instrument systems included in any suitable type of vehicle, including, but not limited to, ground transportation and marine vessels, as well as in vehicle control/management systems located external to the vehicle, for example, but not limited to, an air traffic control system, a rail/mass transit control system, a port control system, a canal control system, and/or an unmanned vehicle control system.

The methods and systems described herein facilitate manually adjusting a value of a parameter without exceeding a predefined maximum or minimum parameter limit. More specifically, in at least one embodiment, the methods and systems described herein enable manual modification, for example, by a member of a flight crew, of a value of a parameter initially defined by an electronic flight instrument system (EFIS). Facilitating manual modification of the parameter value allows the parameter value to be based on conditions that are not monitored by the EFIS, but are perceivable by the flight crew member. The methods and systems described herein also prevent the flight crew from modifying the parameter value to an improper level. Visually providing a display indicator corresponding to the parameter value on a sliding scale, as well as the parameter limits, facilitates modifying the parameter value based on the flight crew selecting and moving the indicator without exceeding the predefined parameter limits.

Technical effects of the methods and systems described herein include at least one of: (a) determining a first parameter value of a first parameter; (b) providing the first parameter value to the display screen for display on a sliding scale; (c) determining at least one parameter limit for the first parameter; (d) providing the parameter limit to the display screen for display on the sliding scale; (e) receiving an adjustment signal from the input device that corresponds to a manual adjustment of the first parameter value from the first parameter value to a second parameter value; and (f) providing the second parameter value to the display screen for display on the sliding scale.

Figure 1:
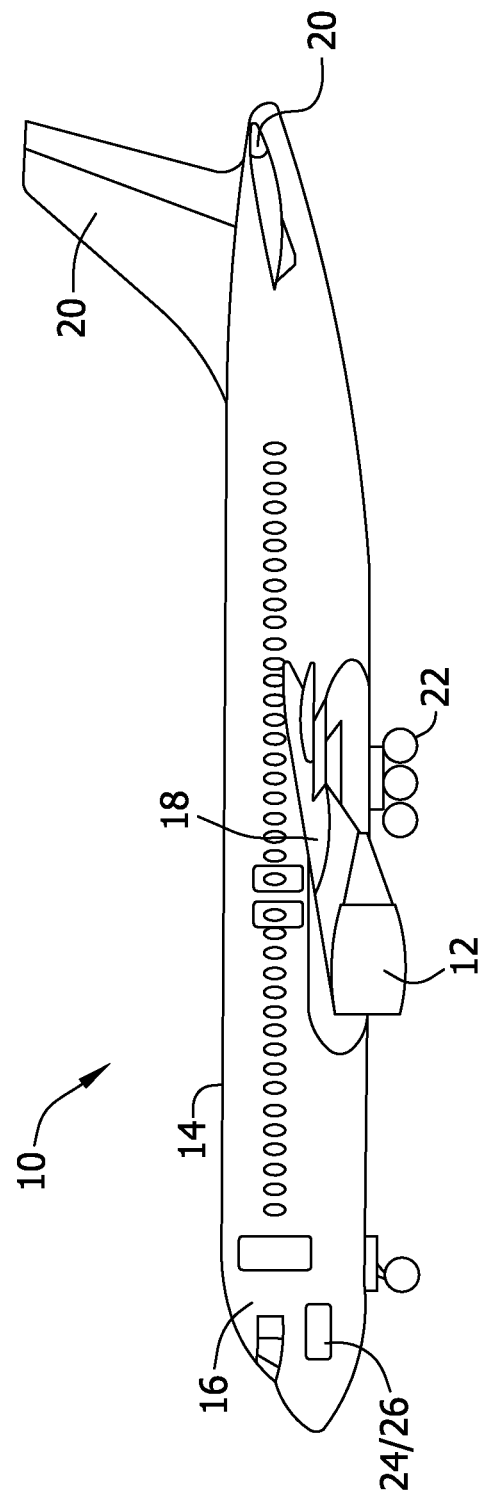
FIG. 1 is a side view of an aircraft that includes an electronic flight instrument system (EFIS).

FIG. 1 is a side view of an exemplary embodiment of a vehicle 10. Although illustrated herein as an aircraft, vehicle 10 may be any type of vehicle, manned or unmanned, that includes a vehicle instrument system. The vehicle instrument system may be included within the vehicle, or may be positioned exterior to the vehicle, for example, in an air traffic control tower, a rail/mass transit control station, or a remote control facility for control of an unmanned vehicle. In the illustrated embodiment, aircraft 10 includes one or more propulsion engines 12 coupled to a fuselage 14, a cockpit 16 positioned in fuselage 14, wing assemblies 18 extending outward from fuselage 14, a tail assembly 20, and a landing assembly 22. Vehicle 10 also includes a vehicle instrument system 24, which within aircraft 10, may be referred to as an electronic flight instrument system (EFIS) 24. EFIS 24 includes a display screen 26. EFIS 24, via display screen 26, provides continuous flight status information to a flight crew, for example, a pilot, a co-pilot, and/or a navigator of aircraft 10. While aircraft 10 is illustrated as a winged airplane, alternative embodiments of EFIS 24 and display screen 26 may be implemented within other aircraft including, without limitation, helicopters.

Figure 2:
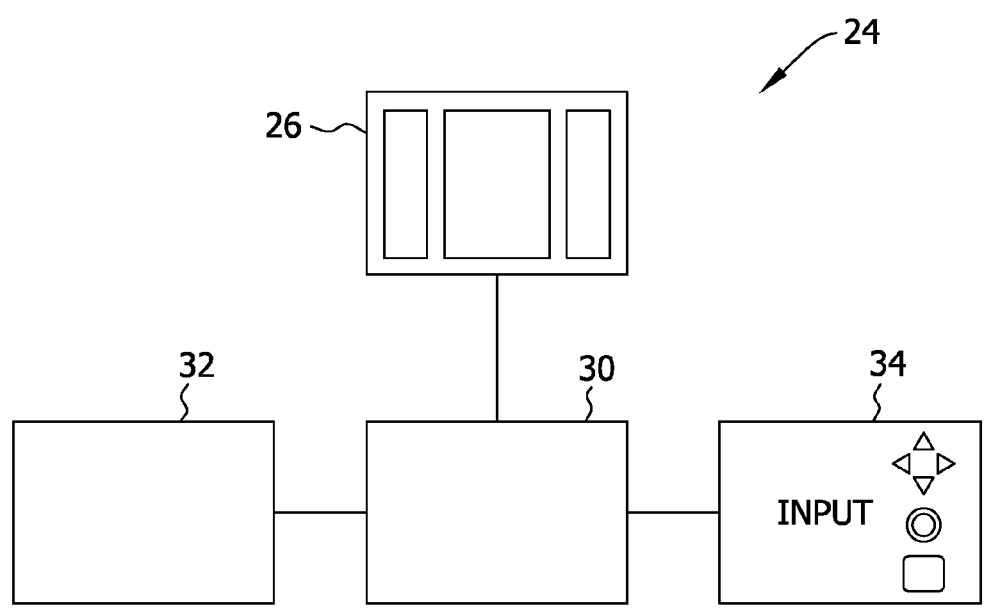
FIG. 2 is a block diagram of an exemplary embodiment of an EFIS that may be included in the aircraft shown in FIG. 1.

FIG. 2 is a block diagram of an exemplary embodiment of an EFIS, for example, EFIS 24 (shown in FIG. 1). In the exemplary embodiment, EFIS 24 includes display screen 26. Display screen 26 may be referred to as a primary flight display (PFD), a navigation display (ND), a multi-function display (MFD), and/or any other type of display. EFIS 24 also includes a processing device 30, at least one sensor 32, and an input device 34. The display screen 26, the at least one sensor 32, and the input device 34 are coupled to processing device 30.

Figure 3:
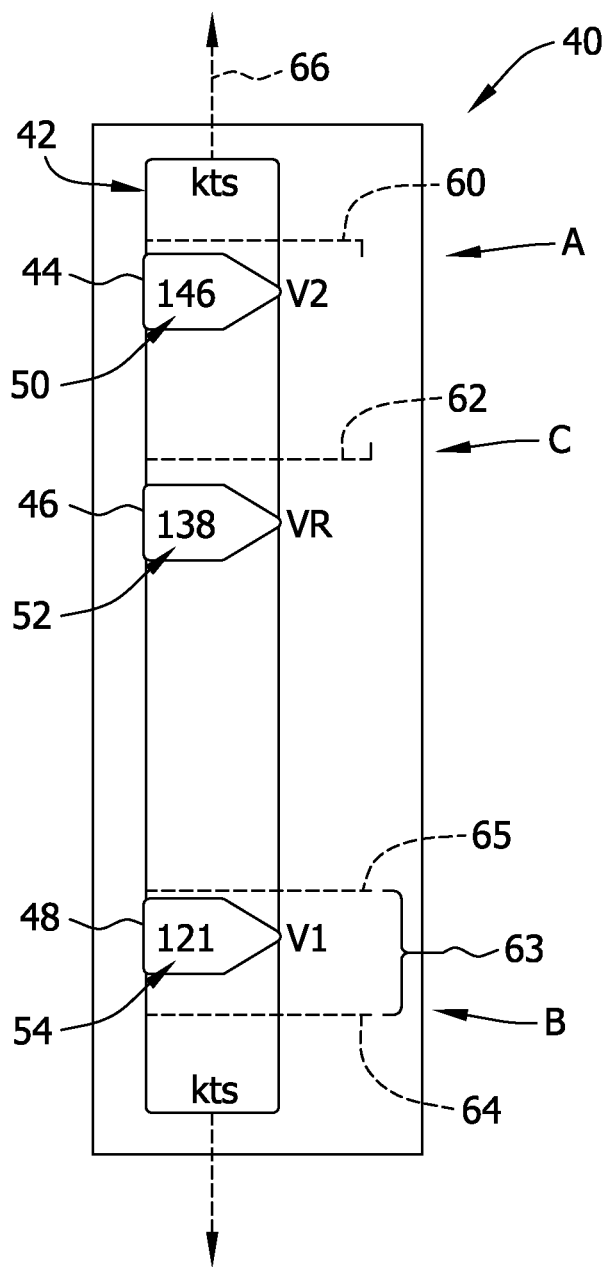
FIG. 3 is an exemplary embodiment of a display generated by the EFIS shown in FIG. 2.

FIG. 3 is an exemplary embodiment of a display 40 generated by EFIS 24 (shown in FIG. 2), which may be displayed to the flight crew on, for example, display screen 26 (shown in FIG. 2). Display 40 includes a sliding scale 42, a first indicator 44, a second indicator 46, and a third indicator 48. As referred to herein, sliding scale 42 is a visual representation of a range of parameter values. Indicators 44, 46, and 48, which each correspond to a flight parameter, may be moved along sliding scale 42 by a user to set a parameter value for each parameter. Although illustrated as including three indicators 44, 46, and 48, display 40 may include any suitable number of indicators that allows EFIS 24 to function as described herein. In the exemplary embodiment, indicators 44, 46, and 48 include a digital readout 50, 52, and 54, respectively.

Digital readout 50, 52, and 54 display numerically the parameter value of the parameter represented by each indicator. Although in the exemplary embodiment, display 40 is an airspeed display, display 40 may also display altitude, an engine speed, and/or any other parameter that allows EFIS 24 to function as described herein. EFIS 24 may also be programmed to show a present parameter value indicator (not shown in FIG. 3), for example, a present airspeed. Display 40 may dynamically change, for example, similar to that of a moving tape or rolling drum, whereby scale 42 shifts up or down such that the present airspeed is readily visible. Displaying the present parameter value may help the user understand, evaluate, and act upon the modifiable parameters.

In the exemplary embodiment, display 40 provides a flight crew with a visual representation of three flight parameters. More specifically, and for example only, display 40 provides a flight crew with a visual representation of three decision points used during take-off. Third indicator 48 visually identifies V1 along sliding scale 42, which is a take-off decision speed. During take-off, if a problem occurs while the aircraft is traveling at a speed of less than V1, take-off can be aborted safely. Conversely, if the problem occurs while the aircraft is traveling at a speed greater than V1, continuing the take-off is the safer option. In the example shown in FIG. 3, V1 has a parameter value of 121 knots. Second indicator 46 visually identifies VR along sliding scale 42, which is the speed at which the aircraft nose gear is raised off the runway surface. In the example shown in FIG. 3, VR has a parameter value of 138 knots. First indicator 44 visually identifies V2 along sliding scale 42, which is the speed at which the aircraft reaches a predefined height above the takeoff surface and may safely perform a roll. In the example shown in FIG. 3, V2 has a parameter value of 146 knots.

In the exemplary embodiment, processing device 30 determines at least one parameter limit. For example, processing device 30 may determine a maximum value 60 for V2 and/or a minimum value 62 for V2. Maximum value 60 and minimum value 62 may be determined based on information corresponding to a status of engine components and/or information corresponding to aircraft configuration. Information corresponding to a status of engine components may include, but is not limited to, information identifying an engine malfunction and/or a flap position. Information corresponding to aircraft configuration may include, but is not limited to, information identifying a type of aircraft and/or components included within the aircraft, and information corresponding to maintenance, operation, and/or performance of aircraft 10. Maximum value 60 and minimum value 62 are provided to display screen 26 for display on sliding scale 42. Sliding scale 42 allows a user to see a relationship between indicators 44, 46, and 48 and associated parameter limits, for example, maximum value 60 and minimum value 62.

In the exemplary embodiment, processing device 30 may also determine a range 63 of values for parameter V1, for example, a range of values based on information available to processing device 30. In the exemplary embodiment, processing device 30 may not have received all the information desired to calculate a suggested value for parameter V1. Processing device 30 may not be able to determine a single value for parameter V1 due to, for example, a missing input to the calculation for parameter V1. Range 63 may represent acceptable values for parameter V1, from a minimum value 64 to a maximum value 65. For example, if the flight crew has yet to input the runway surface condition (e.g., dry, wet, icy, etc.) into processing device 30, then range 63 shown on display 40 provides the flight crew with a visual representation of the range of V1 speeds from high (i.e., maximum value 65, suitable for dry conditions) to low (i.e., minimum value 64, suitable for icy conditions). Although described with respect to parameter V1 and runway surface conditions, ranges of other potential parameter values may be calculated and displayed on display 40, and may be dependent upon any other type of missing information used to calculate a value for the parameter.

In an alternative embodiment, processing device 30 may determine individual calculated values for each possible condition. For example, processing device 30 may calculate, for display on display 40, a "suggested" value for parameter V1 for each of the potential runway surface conditions. In the alternative embodiment, a first suggested value for parameter V1 is shown on display 40 for use when the runway surface condition is dry, a second suggested value for parameter V1 is shown in display 40 for use when the runway surface condition is wet, and a third suggested value for parameter V1 is shown in display 40 for use when the runway surface condition is icy. Although described with respect to parameter V1 and runway surface conditions, multiple discrete predetermined values for other potential parameters may be calculated and displayed on display 40, and may be dependent upon any other type of missing information used to calculate the parameter.

In the exemplary embodiment, processing device 30 also receives an adjustment signal from input device 34 that corresponds to a manual adjustment of a parameter value. In the exemplary embodiment, the adjustment signal is provided by the pilot using input device 34. For example, processing device 30 may provide a graphical user interface for display by display screen 26. The graphical user interface allows the pilot to move a cursor around display screen 26 to facilitate interacting with processing device 30. The pilot controls the position of the cursor within display screen 26, and with respect to objects displayed within the graphical user interface (e.g., first indicator 44, second indicator 46, and third indicator 48). Furthermore, the pilot may select an object included within the graphical user interface. Input device 34 may include, but is not limited to including, a mouse, a directional control pad, a touchpad, and a touch-sensitive display screen.

In the exemplary embodiment, processing device 30 may also receive a selection signal from input device 34. For example, the graphical user interface allows the pilot to select for adjustment one of the three parameters displayed on display 40. Upon receiving a selection signal from input device 34 associated with parameter V2, maximum value 60 and minimum value 62 are displayed on sliding scale 42 and a subsequent adjustment signal from input device 34 will change the parameter value of V2.

In the example shown in FIG. 3, maximum value 60 for parameter V2 is approximately 150 knots. Furthermore, minimum value 62 for parameter V2 is approximately 140 knots. A pilot, using input device 34, may select first indicator 44, and slide first indicator 44 along a major axis 66 of sliding scale 42 to change the parameter value of V2. Processing device 30 prohibits the pilot from changing the parameter value to a value greater than 150 knots or less than 140 knots. The pilot may adjust the predetermined parameter value for V2 based on judgment and/or calculations.

In the exemplary embodiment, the at least one sensor 32 provides sensor data signals to processing device 30. The sensor data signals may correspond to airspeed, altitude, geographical location, aircraft component status, aircraft component operating conditions, weather conditions, and any other measurable flight condition that allows EFIS 24 to function as described herein. Processing device 30 applies the sensor data signals when determining, for example, maximum value 60 and/or minimum value 62.

Figure 4:
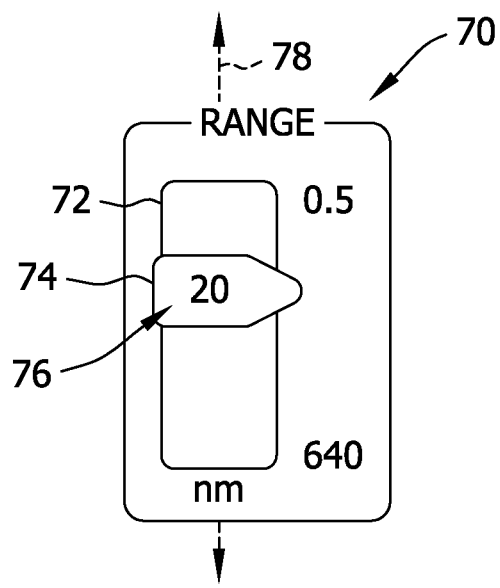
FIG. 4 is a first alternative embodiment of a display generated by the EFIS shown in FIG. 2.

FIG. 4 is a first alternative embodiment of a display 70 generated by EFIS 24 (shown in FIG. 2). Display 70 includes a sliding scale 72 and a first indicator 74. First indicator 74 includes a digital readout 76 that provides the actual parameter value associated with first indicator 74 in its present position relative to sliding scale 72. In the first alternative embodiment, display 70 provides a flight crew with a visual representation of a range parameter, for example, a range shown on a map. The map may be displayed on a PFD, and in the example shown in FIG. 4, the area shown by the map can be adjusted from 0.5 nautical miles to 640 nautical miles. Processing device 30 (shown in FIG. 2) may receive an adjustment signal from input device 34 (shown in FIG. 2) that corresponds to a manual adjustment of the range shown on the map. More specifically, first indicator 74 may be selected using input device 34 and moved along a major axis 78 of sliding scale 72 to adjust the range shown on the map.

Figure 5:
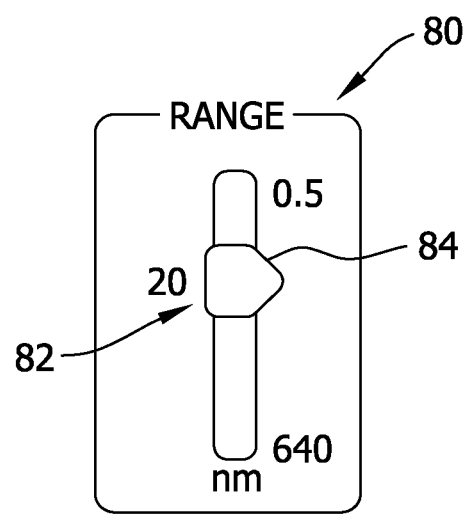
FIG. 5 is a second alternative embodiment of a display generated by the EFIS shown in FIG. 2.
Figure 6:
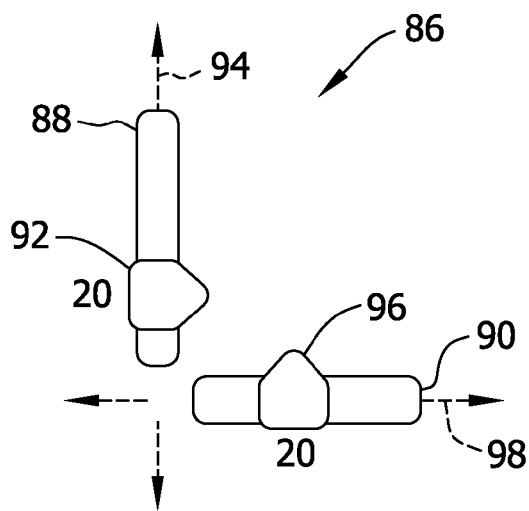
FIG. 6 is a third alternative embodiment of a display generated by the EFIS shown in FIG. 2.

FIG. 5 is a second alternative embodiment of a display 80 generated by EFIS 24 (shown in FIG. 2). In contrast to display 70, display 80 includes a digital readout 82 positioned adjacent to a first indicator 84. FIG. 6 is a third alternative embodiment of a display 86 generated by EFIS 24. Display 86 includes a first sliding scale 88 and a second sliding scale 90. Display 86 includes a first indicator 92 configured to move along a major axis 94 of sliding scale 88 and also a second indicator 96 configured to move along a major axis 98 of sliding scale 90.

Figure 7:
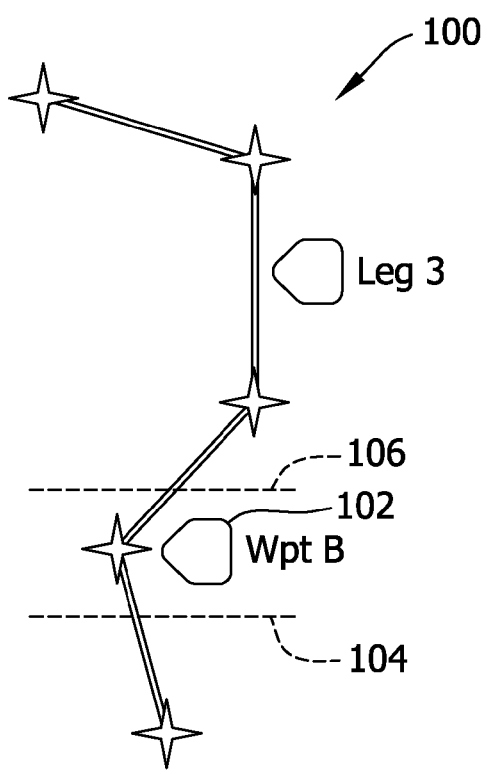
FIG. 7 is a fourth alternative embodiment of a display generated by the EFIS shown in FIG. 2.

FIG. 7 is a fourth alternative embodiment of a display 100 generated by EFIS 24 (shown in FIG. 2). In the alternative embodiment, display 100 illustrates a navigational route. Parameters that may be shown on display 100 include, but are not limited to, a holding point or other flight plan change. For example, processing device 30 may determine a suggested position within the navigational route for a first waypoint 102. Processing device 30 may also determine a range of positions in which first waypoint 102 may be positioned, for example, a minimum 104 and a maximum 106. Minimum 104 and maximum 106 may be determined based on, for example only, a fuel level, a flight time, an altitude, and/or a phase of flight. The sliding scales described herein may be oriented horizontally, vertically, or in any other orientation that allows information to be displayed as described herein. Furthermore, the information described herein may be displayed on substantially straight sliding scales, sliding scales forming a shape including, but not limited to, a circle, a substantially arc shaped sliding scale, or a scale having any shape that allows information to be displayed as described herein.

Figure 8:
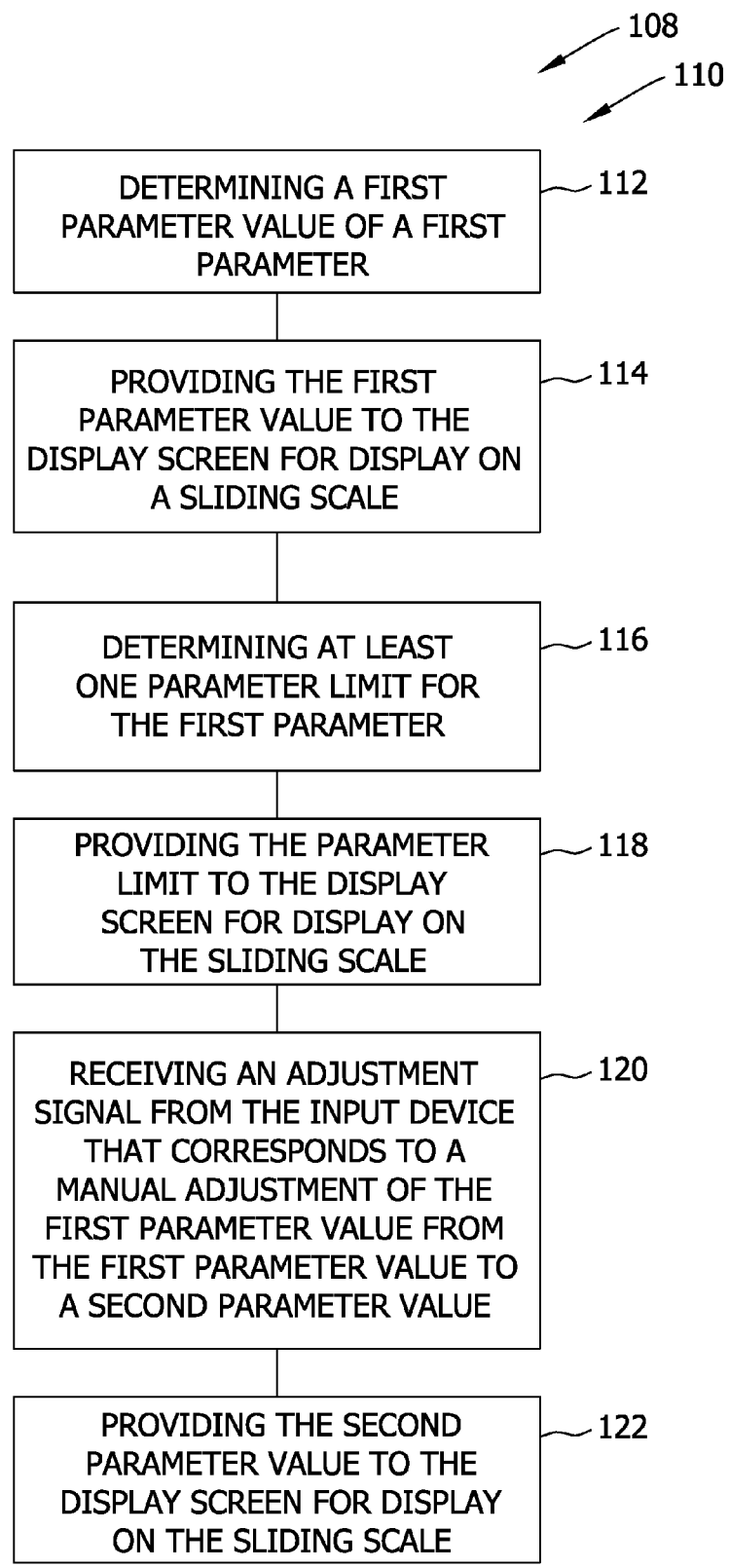
FIG. 8 is a flow chart of an exemplary method for modifying a parameter value determined by the EFIS shown in FIG. 2.

FIG. 8 is a flow chart 108 of an exemplary method 110 for modifying a parameter value determined by an electronic flight instrument system (EFIS), for example, EFIS 24 (shown in FIG. 2). As described above, EFIS 24 includes an input device, for example, input device 34, a display screen, for example, display screen 26, and a processing device, for example, processing device 30. In the exemplary embodiment, method 110 includes determining 112 a first parameter value of a first parameter and providing 114 the first parameter value to display screen 26 for display on a sliding scale, for example, sliding scale 42 (shown in FIG. 3). Method 110 also includes determining 116 at least one parameter limit for the first parameter and providing 118 the parameter limit to display screen 26 for display on sliding scale 42. An example of a parameter limit is maximum value 60 for parameter V2 (shown in FIG. 3). Method 110 also includes receiving 120 an adjustment signal from input device 34 that corresponds to a manual adjustment of the first parameter value from the first parameter value to a second parameter value. Furthermore, method 110 also includes providing 122 the second parameter value to display screen 26 for display on sliding scale 42.

Processing device 30 may be coupled to, or included within, a computer or computing device. More specifically, processing device 30 may be included within a symbol generator, a display processing computer, a display electronics unit, a display processor unit, a flight director computer, a flight management system, and/or any other computing device included within aircraft 10 (shown in FIG. 1). A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Combinations of any of the above are also included within the scope of computer readable media.

The methods and systems described herein may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the methods and systems described herein may be implemented with any number and organization of such components or modules. For example, the methods and systems described herein are not limited to the specific computer-executable instructions or the specific components or modules illustrated in the figures and described herein. Other embodiments may include different computer-executable instructions or components having more or less functionality than illustrated and described herein. Furthermore, the methods and systems described herein may also be practiced in distributed computing environments where tasks are performed by remote processing devices that are linked through a communications network. In a distributed computing environment, program modules may be located in both local and remote computer storage media including memory storage devices.

Although described herein with respect to special-purpose computing devices such as a processing device included within an EFIS, aspects of the invention may transform a general-purpose computer into a special-purpose computing device when configured to execute the instructions described herein.

Described herein are exemplary methods and systems for manually adjusting a parameter value without exceeding a predefined maximum or minimum parameter limit. More specifically, the methods and systems described herein enable manual modification, by a member of a flight crew, of a parameter value defined by an electronic flight instrument system (EFIS). Facilitating manual modification of the parameter value allows the parameter value to be based on conditions that are not monitored by the EFIS, but are perceivable by the flight crew member. The methods and systems described herein also prevent the flight crew from modifying the parameter value to an improper level. Visually providing an indicator corresponding to the parameter value on a sliding scale and modifying the parameter value based on the flight crew selecting and moving the indicator, facilitates manual adjustment of the parameter value without exceeding predefined parameter limits.

The methods and systems described herein facilitate efficient and economical control of an EFIS. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle instrument system comprising:
an input device configured to receive an input command;
a display screen configured to display information on a sliding scale including a parameter value associated with a parameter associated with the vehicle;
at least one sensor configured to provide sensor data signals relating to the parameter; and
a processing device coupled to said input device, said at least one sensor, and said display screen, said processing device configured to:
display a current parameter value on the sliding scale, the current parameter value corresponding to the sensor data signals provided by the at least one sensor;
determine at least one parameter limit for a first setting of a first parameter indicator;
provide the at least one parameter limit to said display screen for display on the sliding scale;
receive an adjustment signal from said input device that corresponds to a manual adjustment of the first parameter indicator from the first setting to a second setting of the first parameter indicator; and
provide the second setting to said display screen for display on the sliding scale.

2. The vehicle instrument system of claim 1, wherein said display screen is further configured to display a first setting associated with a second parameter indicator on the sliding scale.

3. The vehicle instrument system of claim 2, wherein said processing device is further configured to:
receive a selection signal from said input device that corresponds to a selection of one of the first parameter indicator and the second parameter indicator; and adjust the setting associated with the selected parameter indicator in response to a subsequent adjustment signal from said input device.

4. The vehicle instrument system of claim 1, wherein said processing device is further configured to provide a graphical user interface that includes the sliding scale for display by said display screen, said graphical user interface including a cursor to facilitate interacting with said processing device.

5. The vehicle instrument system of claim 4, wherein said input device comprises a cursor control device for controlling a position of said cursor on said display screen and for selecting objects included within said graphical user interface.

6. The vehicle instrument system of claim 5, wherein said cursor control device comprises at least one of a mouse, a directional control pad, a touchpad, and a touch-sensitive display screen.

7. The vehicle instrument system of claim 1, wherein said display screen is configured to display the setting of the first parameter indicator as an indicator positioned on the sliding scale.

8. The vehicle instrument system of claim 7, wherein said processing device is further configured to move said indicator along a major axis of the sliding scale in response to an adjustment signal from said input device.

9. The vehicle instrument system of claim 1, wherein said sensor data signals correspond to at least one of an airspeed, an altitude, a geographical location, aircraft component status, weather conditions, and an aircraft component operating condition.

10. The vehicle instrument system of claim 1, wherein said at least one parameter limit comprises a maximum parameter limit, said processing device further configured to prevent the second parameter value from exceeding the maximum parameter limit.

11. The vehicle instrument system of claim 1, wherein said at least one parameter limit comprises a minimum parameter limit, said processing device further configured to prevent reducing the second parameter value below the minimum parameter limit.

12. A method for modifying a parameter value determined by a vehicle instrument system, the vehicle instrument system including an input device, a display screen, and a processing device, said method comprising:
  determining a first setting of a first parameter indicator;
  providing the first setting to the display screen for display on a sliding scale;
  determining at least one parameter limit for the first parameter indicator;
  providing the at least one parameter limit to the display screen for display on the sliding scale;
  receiving an adjustment signal from the input device that corresponds to a manual adjustment of the first indicator from the first setting to a second setting;
  providing the second setting to the display screen for display on the sliding scale;
  displaying, on the sliding scale, a current value of a sensed parameter relating to an operation of a vehicle.

13. The method of claim 12, wherein determining at least one parameter limit comprises determining at least one of a range of parameter values, and a plurality of discrete predetermined values for the first parameter indicator.

14. The method of claim 13, further comprising preventing adjustment of the first parameter indicator to a value outside of the range of parameter values.

15. The method of claim 13, further comprising receiving a selection signal from the input device that corresponds to a selection of one of the plurality of discrete predetermined values.

16. The method of claim 12, wherein providing the first setting to the display screen for display on the sliding scale comprises displaying an indicator at a position relative to the sliding scale that visually represents the first setting.

17. The method of claim 12, further comprising:
  determining a first setting of a second parameter indicator;
  providing the first setting of the second parameter indicator to the display screen for display on the sliding scale;
  determining at least one parameter limit for the second parameter indicator; and
  providing the at least one parameter limit to the display screen for display on the sliding scale.

18. The method of claim 17, further comprising:
  receiving a selection signal from the input device selecting one of the first parameter indicator and the second parameter indicator;
  receiving an adjustment signal from the input device that corresponds to a manual adjustment of the setting of the selected parameter indicator; and
  providing the adjusted setting to the display screen for display on the sliding scale.

19. The method of claim 12, wherein providing the first parameter value to the display screen for display on the sliding scale comprises:
  displaying the first setting as an indicator positioned on the sliding scale; and
  moving the indicator along the sliding scale in response to the adjustment signal from the input device.

* * * * *